(12) United States Patent
Smith et al.

(10) Patent No.: US 10,292,322 B2
(45) Date of Patent: May 21, 2019

(54) HYDRAULIC SYSTEM FOR FLEX WING RIPPER STRIPPER

(71) Applicant: Unverferth Manufacturing Co., Inc., Kalida, OH (US)

(72) Inventors: David R. Smith, Fort Jennings, OH (US); William C. Maenle, Ottoville, OH (US)

(73) Assignee: Unverferth Manufacturing Co., Inc., Kalida, OH (US)

( * ) Notice: Subject to any disclaimer, the term of this patent is extended or adjusted under 35 U.S.C. 154(b) by 94 days.

(21) Appl. No.: 15/457,527

(22) Filed: Mar. 13, 2017

(65) Prior Publication Data

US 2017/0325396 A1    Nov. 16, 2017

Related U.S. Application Data

(60) Provisional application No. 62/336,271, filed on May 13, 2016.

(51) Int. Cl.
| | | |
|---|---|---|
| *A01B 73/04* | (2006.01) | |
| *A01B 59/00* | (2006.01) | |
| *F15B 13/02* | (2006.01) | |
| *F15B 13/06* | (2006.01) | |

(52) U.S. Cl.
CPC .......... *A01B 73/044* (2013.01); *A01B 59/002* (2013.01); *F15B 13/025* (2013.01); *F15B 13/06* (2013.01); *F15B 2211/205* (2013.01); *F15B 2211/7051* (2013.01)

(58) Field of Classification Search
CPC ....... A01B 73/044; A01B 73/04; A01B 73/02; A01B 73/00; A01B 59/002; A01B 59/00; F15B 13/025; F15B 13/02; F15B 13/00; F15B 13/06; F15B 2211/205; F15B 2211/20; F15B 2211/00; F15B 2211/7051; F15B 2211/705; F15B 2211/70
See application file for complete search history.

(56) References Cited

U.S. PATENT DOCUMENTS

| | | |
|---|---|---|
| 4,700,784 A | 10/1987 | Wiebe et al. |
| 2016/0081260 A1 | 3/2016 | Steffan et al. |

*Primary Examiner* — Christopher J. Novosad
(74) *Attorney, Agent, or Firm* — Rothwell, Figg, Ernst & Manbeck, PC

(57) ABSTRACT

A hydraulic system for a farm implement includes a wing elevation circuit, a wing folding circuit, and a hydraulic valve block assembly. The wing elevation circuit lowers or raises the wings of the farm implement relative to a frame of the farm implement between a first position, in which the wings extend approximately collinear with a lateral axis of the frame, and a second position, in which the wings extend beneath the lateral axis of the frame. The wing folding circuit folds or unfolds the wings between the first position and a transport position, in which the wings are rotated beyond a vertical axis transverse to the lateral axis. The hydraulic valve block assembly is in communication with the wing elevation circuit and the wing folding circuit and controls hydraulic fluid flow in the wing elevation circuit and in the wing folding circuit.

9 Claims, 14 Drawing Sheets

HYDRAULIC SYSTEM FOR FLEX WING RIPPER STRIPPER

CROSS REFERENCE OF RELATED APPLICATION

This application claims the benefit under 35 U.S.C. § 119(e) of the filing date of provisional patent application Ser. No. 62/336,271 filed May 13, 2016, the disclosure of which is incorporated herein by reference in its entirety.

FIELD OF INVENTION

The present invention relates generally to hydraulic systems for a farm implement and, more particularly, to a hydraulic system for a tillage equipment such as a flex wing ripper.

BACKGROUND

In the agriculture industry, there are many types of tillage tools that are controlled and operated using hydraulic systems. These tillage tools can be designed to be towed behind a vehicle, such as a tractor, so as to prepare a field to facilitate in the planting of crops. The control of the tillage tools may be provided, for example, by a hydraulic supply located on the vehicle. The vehicle can tow and control multiple tillage tools.

Additionally, in the agricultural industry, soil that is to be used for planting may be tilled to improve the soil. Tilling may be done by agitating the soil with a mechanical system or tool, such as rollers, harrows or hand tools. The benefits of tilling include loosening and aerating the soil, which makes it easier for the seed to be planted, and spreading the nutrients in the soil such that it is more evenly distributed within the soil to be used for planting. Other benefits of tilling include mechanical destruction of weeds, drying the soil, and exposure of soil crumble so that it may be destroyed by the environment. There is a need for improved hydraulic systems for tillage equipment.

For example, tillage tools are typically provided on an implement that is hitched to a tractor. The implement includes a frame oriented perpendicular to the to the implement's direction of travel. In order to furrow or agitate the soil over large intervals, the frame of the implement includes a pair of wings that extend at relatively large lengths from the sides of the frame. However, when an implement is towed over uneven or rolling terrain, the weight distribution along the length of the wing becomes uneven. Consequently, the tillage tools extending from the wings of the implement penetrate the soil unevenly along the length of the wings. Thus, there is a need for a hydraulic system that can adjust the pressure along the wings of the implement accordingly so that the implement can ensure the attached tillage tools penetrate the soil at uniform depths along the length of the wings even when the implement is towed over uneven or rolling terrain.

SUMMARY OF THE INVENTION

Advantages of some aspects of the present invention include improved hydraulic control of a farm implement. Other advantages will become apparent from the description that follows.

According to a first aspect of the invention, a hydraulic system for a farm implement having wings may include a wing elevation circuit, a wing folding circuit, and a hydraulic valve block assembly in communication with the wing elevation circuit and the wing folding circuit. The wing elevation circuit is operable to raise or lower the wings of the farm implement between a first position approximately level with a frame of the farm implement to a second position extending beneath the level of the frame. The wing folding circuit is operable to fold or unfold the wings of the farm implement between the first position approximately level with the frame of the farm implement to a transport position, wherein the wings are rotated beyond a vertical axis transverse to the frame of the farm implement. The hydraulic valve block assembly is configured to control a flow of a hydraulic fluid in the wing elevation circuit and in the wing folding circuit. In some embodiments, the wing elevation circuit is further sequenced and cycled with a raise and lower cycle of a tractor hitch of the farm implement.

In some embodiments, the hydraulic system may comprise one or more cylinders, in which each cylinder is in communication with the wing elevation circuit and the wing folding circuit, and each cylinder is configured to raise or lower a respective wing of the farm implement and fold or unfold a respective wing of the farm implement. Each cylinder may comprise a first chamber and a second chamber, wherein the first chamber and the second chamber are separated by a partition plate, and the first chamber is in communication with the wing elevation circuit and the second chamber is in communication with the wing folding circuit. The first chamber may comprise a wing-elevation rod extending through a first end of the cylinder, a first rod-side port adjacent to the first end of the cylinder, and a first partition-side port adjacent to the partition of the cylinder. The first rod-side port and the second partition port may be in communication with the wing-elevation circuit. The second chamber may comprise a wing-folding rod extending through a second end of the cylinder, a second rod-side port adjacent to the second end of the cylinder, and second a partition-side port adjacent to the partition of the cylinder. The rod-side port and the second partition port are in communication with the wing-elevation circuit.

In some embodiments, the hydraulic valve block assembly may comprise a plurality of cylinder ports in direct communication with the one or more cylinders and a plurality of return/supply ports in communication with one or more hydraulic outlets of a vehicle. The hydraulic valve block assembly may include a pressure reducing valve connected to the wing folding circuit, a directional valve connected to the wing folding circuit, and a sequence valve connected to the wing elevation circuit. The sequence valve is configured to redirect hydraulic fluid between the wing elevation circuit and the wing folding circuit based upon a predetermined pressure in the wing elevation circuit.

In another aspect of the invention, a method for operating a farm implement having wings via a hydraulic system may include unfolding the wings using the hydraulic system to a position approximately level with a frame of the farm implement. The method may further include fully extending the wings using the hydraulic system as the farm implement is lowered into a soil by lowering of a tractor hitch on the farm implement. The farm implement is lowered until it reaches a soil working position. The method may further include maintaining a downforce on the wings using the hydraulic system, wherein the wings of the farm implement are able to flex through the soil during a soil tillage operation.

In some embodiments, the method may further include retracting the wings back to the position approximately level with the frame of the farm implement in response to the farm implement being raised out of the soil by raising of the tractor hitch. In some embodiments, the method further may further include folding the wings using the hydraulic system to a transport position, wherein the wings are rotated beyond a vertical axis transverse to the frame of the farm implement.

DETAILED DESCRIPTION OF THE PRESENT INVENTION

While the present invention may be embodied in many different forms, a number of illustrative embodiments are described herein with the understanding that the present disclosure is to be considered as providing examples and not intended to limit the invention to the preferred embodiments described and/or illustrated herein.

An exemplary embodiment of a hydraulic system and an exemplary method of using such a hydraulic system is now described. The exemplary embodiment, as illustrated in FIGS. 1-8E, is described in relation to the Unverferth Flex Wing Ripper Stripper®. One of ordinary skill in the art will appreciate that embodiments of the present hydraulic system are applicable to other types of tillage equipment or other types of farm implements. Any dimensions shown in the figures are for illustrative purposes and describe a non-limiting embodiment.

Figure 1:
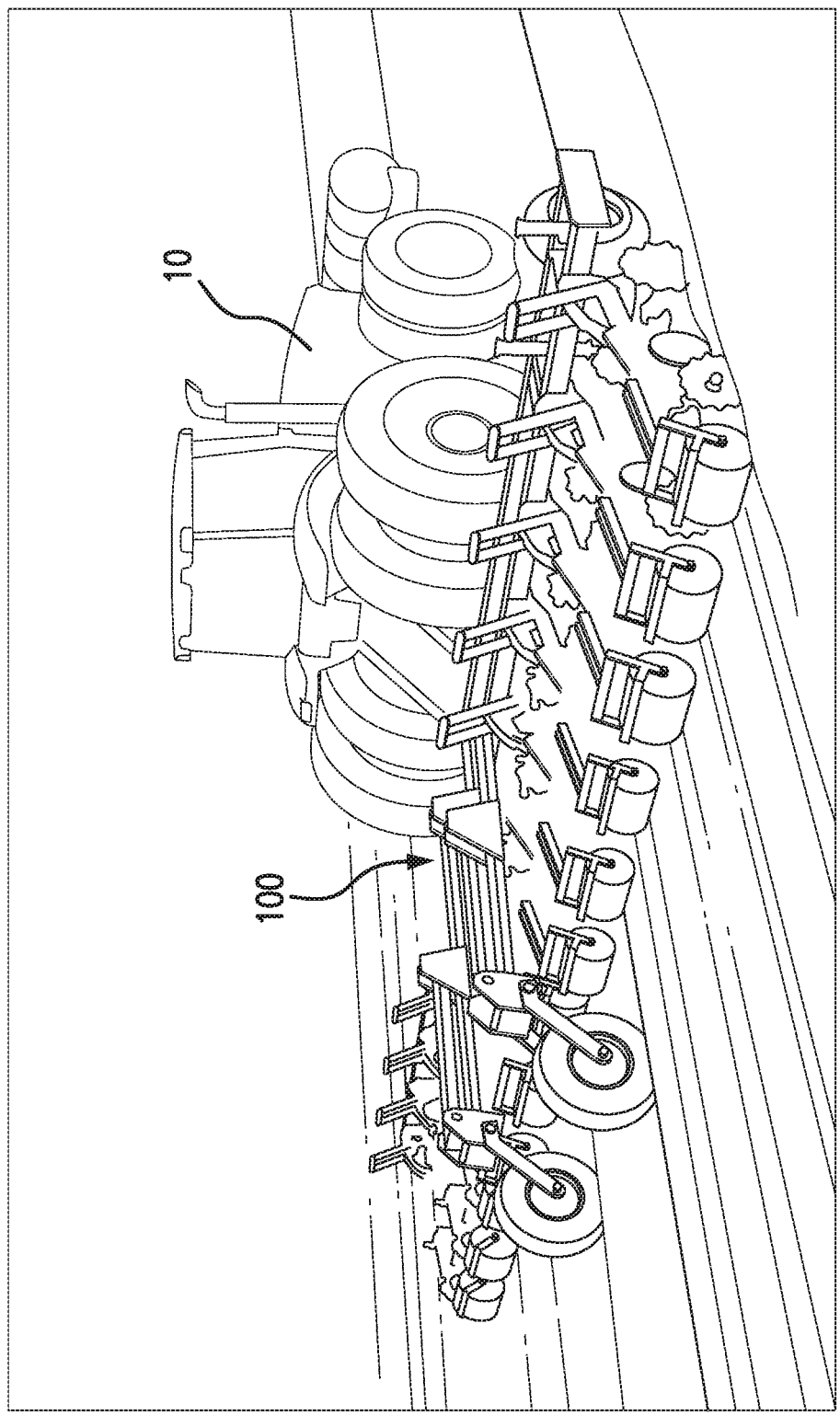
FIG. 1 is an example view of a farm implement towed by a vehicle according to non-limiting embodiments of the present invention.

FIG. 1 is an example view of a farm implement 100, such as an Unverferth Flex Wing Ripper Stripper®, in accordance with aspects of the present invention. As shown in FIG. 1, the farm implement 100 is towed behind a vehicle 10, such as a tractor, in a soil working position. The farm implement 100 is connected to the vehicle 10 by a standard three-point hitch. However, one of ordinary skill in the art will recognize that the farm implement 100 may be connected to the vehicle 10 by other means without departing from the scope of the present invention. In an alternative embodiment, the implement 100 is not a towable vehicle, but is a self-propelled vehicle having three or more wheels, a motor, transmission, and operator control and steering components.

FIGS. 2A-D illustrate a farm implement 100 according to an embodiment of the present invention. The farm implement 100 compromises a main frame 110 and two wings 120, in which the wings 120 extend laterally outward from the ends of the main frame 110. Each wing 120 is mounted to a respective end of the main frame 110 by a pivot assembly 130. Accordingly, the wings 120 are configured to fold or pivot with respect to the main frame 110. The main frame 110 is supported by wheels 142 and includes a plurality of frame shanks 152 extending toward the ground. Each wing 120 includes at least one wheel 144 and a plurality of wing shanks 154 extending toward the ground. However, in alternative embodiments, the main frame 110 or the wings 120 may include other sets of tools, such as knives, spikes, tines, or ripper points.

According to one aspect of the present invention, a hydraulic system 200 is provided for the farm implement 100. As shown in FIGS. 2A-D, the hydraulic system 200 comprises one or more cylinders 210, a hydraulic valve block assembly 240, and a plurality of hoses (not shown) interconnecting the one or more cylinders 210 to the hydraulic valve block assembly 240. According to the illustrated embodiment, each cylinder 210 is connected to the main frame 110 and a respective wing 120 of the farm implement so that the cylinder 210 effects powered movement of the respective wing 120. The hydraulic valve block assembly 240 is mounted to the main frame 110 and positioned between each cylinder 210 of the hydraulic system 200 so that the hydraulic valve block assembly 240 controls flow of hydraulic fluid to each cylinder 210 of the hydraulic system 200.

Figure 2A:
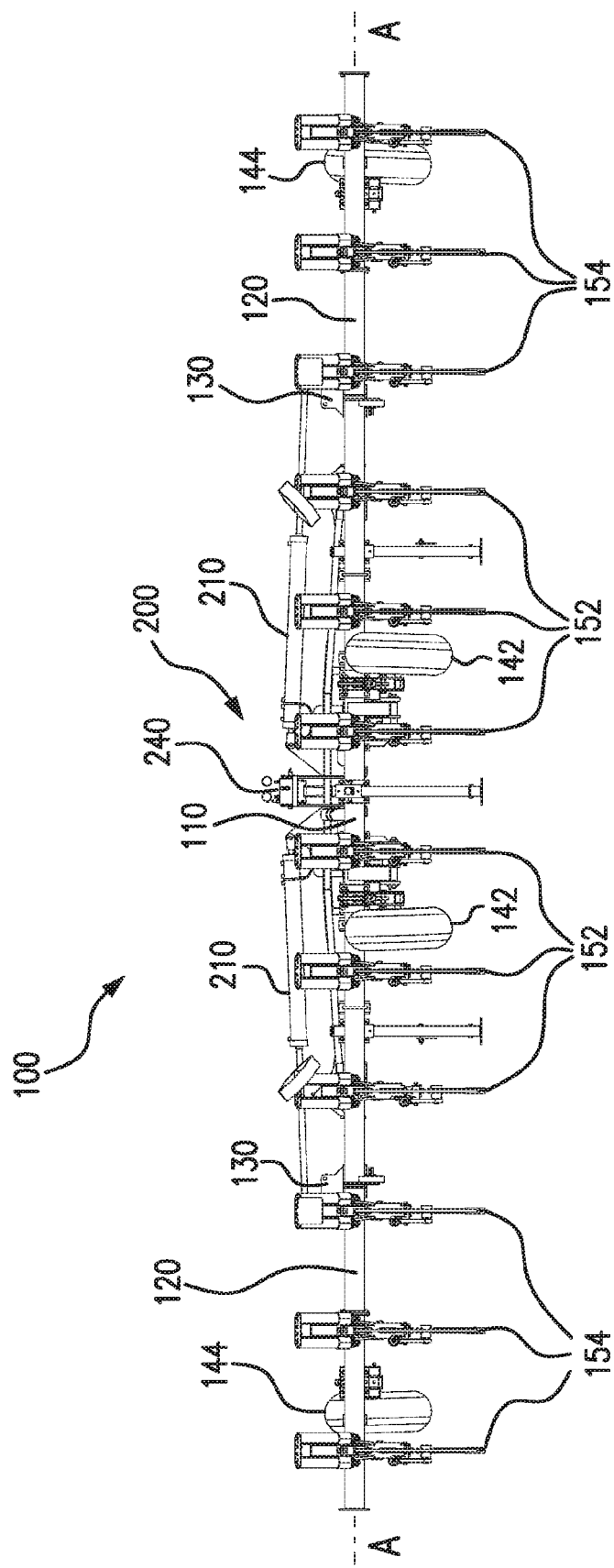
FIGS. 2A-D illustrate a front view of an implement with wings and a hydraulic system according to non-limiting embodiments of the present invention
Figure 2B:
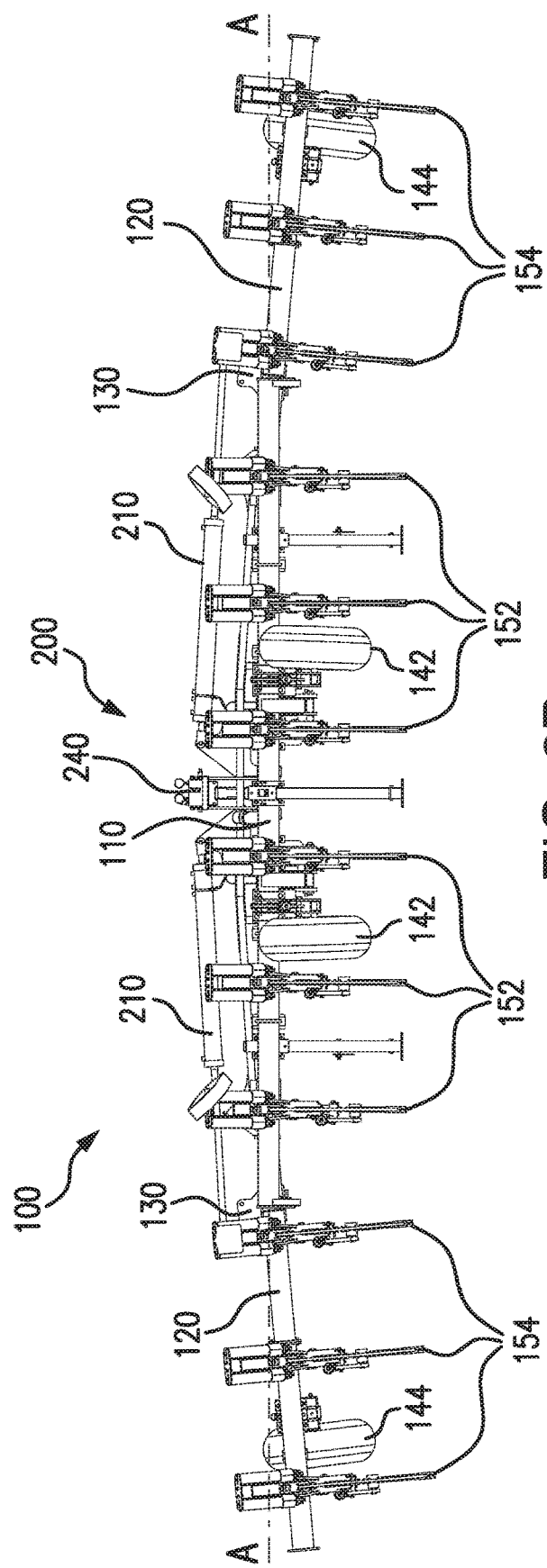
Figure 2C:
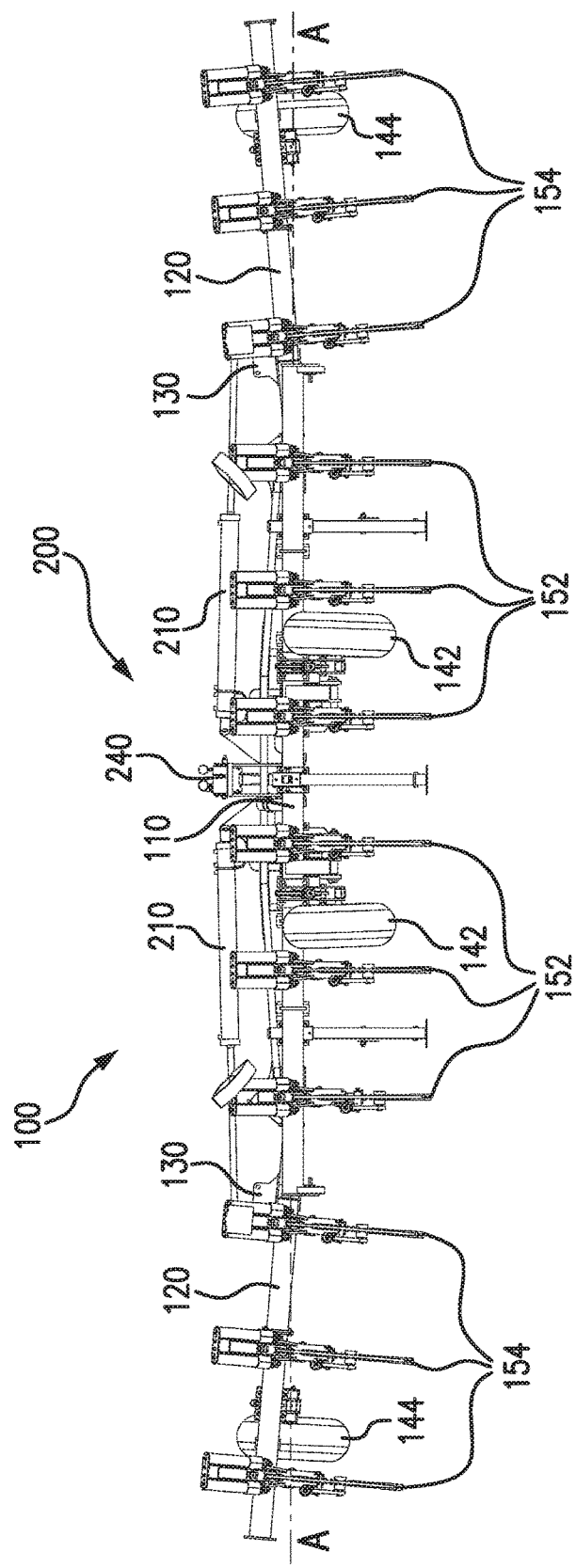

The hydraulic system 200 provided for such farm implement 100 according to the present invention may include some or all of the following features. The hydraulic system 200 may be operable to raise or lower one or more wings 120 of the farm implement 100 while in the operating position. Referring to FIGS. 2A-C, the farm implement 100 is in the operating position and the wings 120 are pivoted between a lowered operating position and a raised operating position. FIG. 2A shows the wings 120 in a base position (i.e. first position), in which the wings 120 are aligned and collinear along a lateral axis A defined by the main frame 110 of the implement 100. FIG. 2B shows the wings 120 in a lowered operating position (i.e. second position), in which the wings 120 are pivoted downwardly to the ground level so that all the wheels 142, 144 and shanks 152, 154 engage the ground. The wings 120 may be pivoted to intermediate positions between the base position and the lowered operating position so that the implement 100 may accommodate different ground contours. FIG. 2C shows the wings 120 in the raised operating position (i.e. third position), in which the wings 120 are pivoted upwardly from the lateral axis A defined by main frame 110. The wings 120 may be placed in the raised operating position while the implement 100 is being repositioned, for example when the implement reaches the end of a crop row and turns around to go back down an adjacent crop row.

Figure 2D:
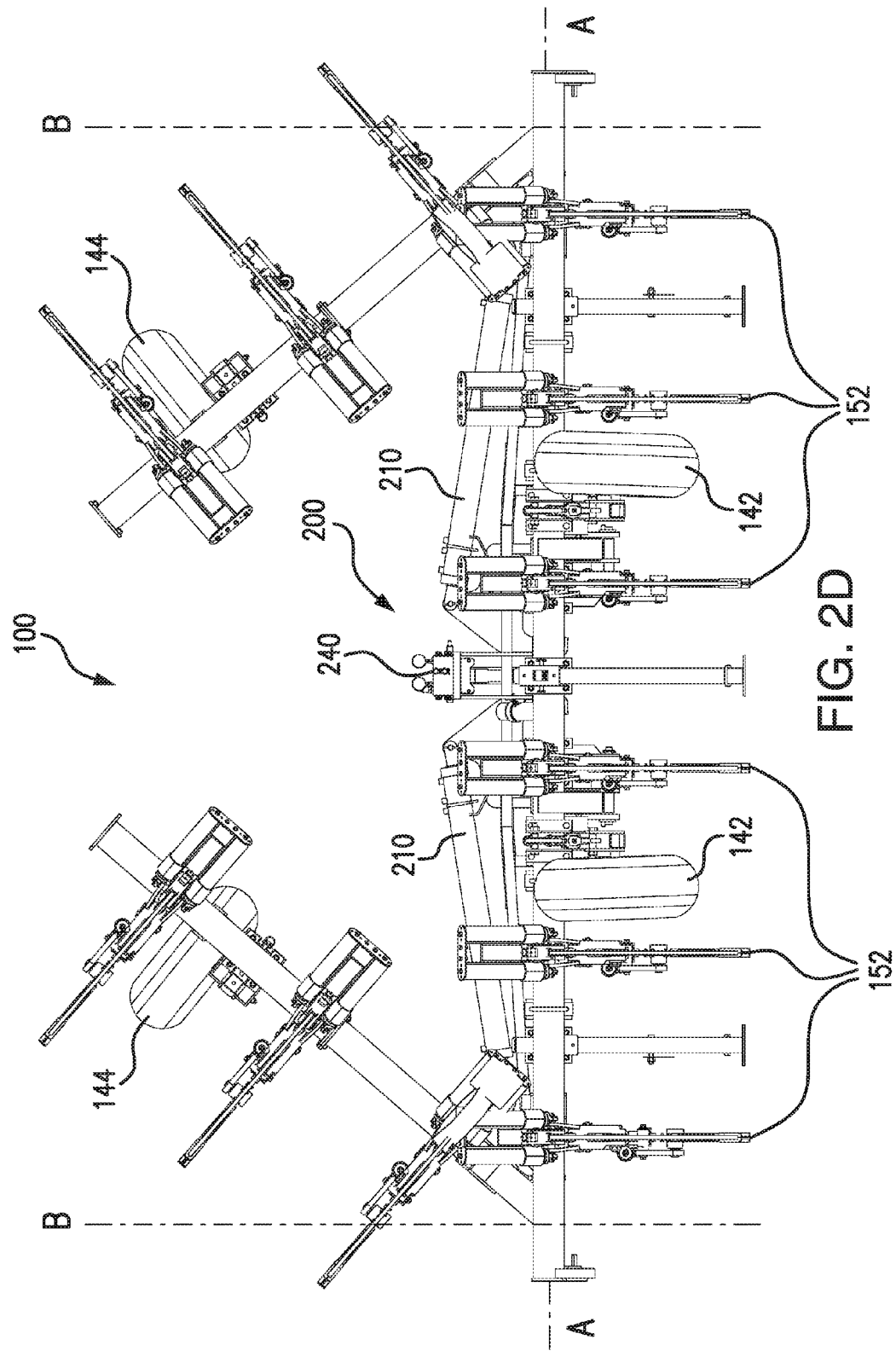

The hydraulic system 200 may be operable to fold or unfold the one or more wings 120 of the farm implement 100, such as from a base position to a transport position. FIG. 2D shows the wings 120 in the transport position, in which the wings 120 are folded along an axis transverse to the main frame 110. In the transport position, the wings 120 are rotated beyond a vertical axis B that is transverse to a lateral axis A defined by the main frame. For example, the total rotation of a wing 120 with respect to the main frame 110 may be about 176°±5°.

The hydraulic system 200 may be able to cause a controlled downward pressure on the wings 120 of the farm implement 100, for example, in order to maintain proper soil working depth, or allow one or more wings 120 of the farm implement 100 to float up or down in the field. The hydraulic system may include valves, pumps, motors, and/or other devices to control the movement of the main frame 110 and the wings 120. The hydraulic system may be further described in FIGS. 3A-8B.

According to the illustrative embodiment of the present invention, the hydraulic cylinders 210 may have a dual function. For example, as shown in FIGS. 3A-D, a cylinder 210 according to an embodiment of the present invention comprises two separate chambers, a first chamber 220 and a second chamber 230 in one cylinder body, thereby allowing the cylinder 210 to lift a respective wing of a farm implement to level on the end of the field by the first chamber 220 of the cylinder 210 and fully fold the respective wing into a transport position by the second chamber 230 of the cylinder 210. The first chamber 220 and the second chamber 230 are separated by a partition plate 216 that extends transversely through longitudinal axis of the cylinder 210. The first chamber 220 is extends between a first end 212 of the cylinder 210 and the partition plate 216, and the second chamber 230 extends between a second end 214 of the cylinder 210 and the partition plate 216. The length of the second chamber 230 is greater than the length of the first chamber 220 so that the second chamber 230 may alter the position of the wing by a greater distance.

Figure 3A:
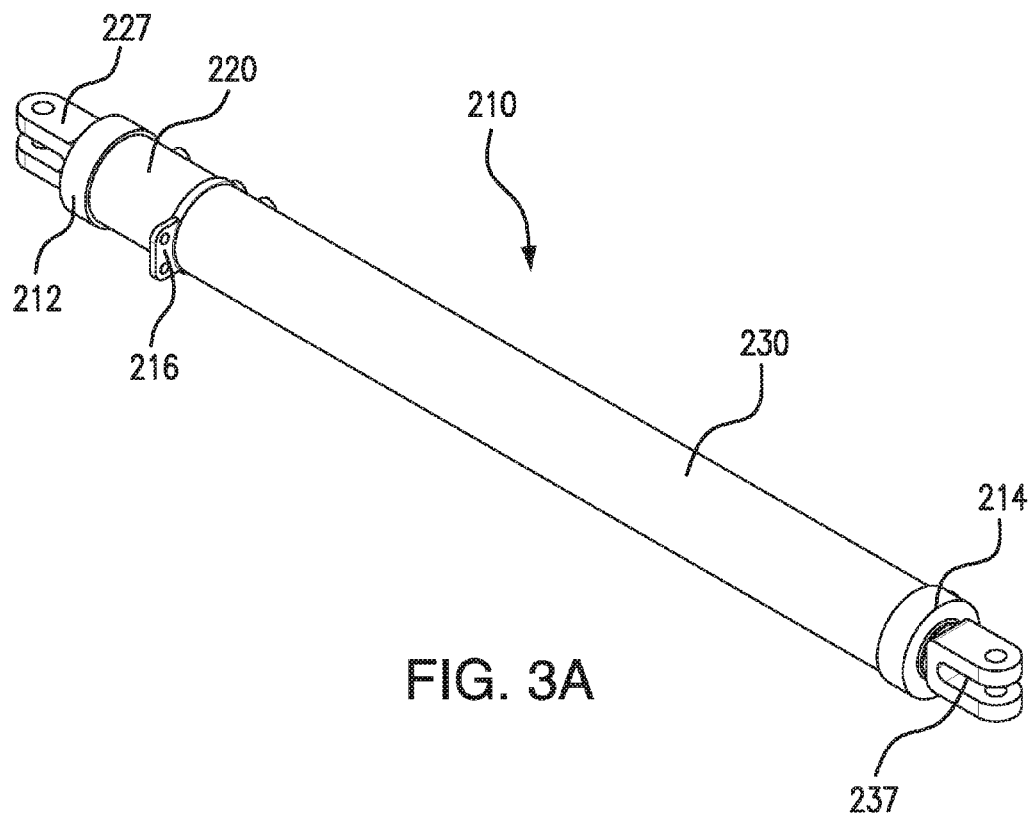
FIG. 3A illustrates a perspective view of a hydraulic cylinder according to non-limiting embodiments of the present invention.
Figure 3B:
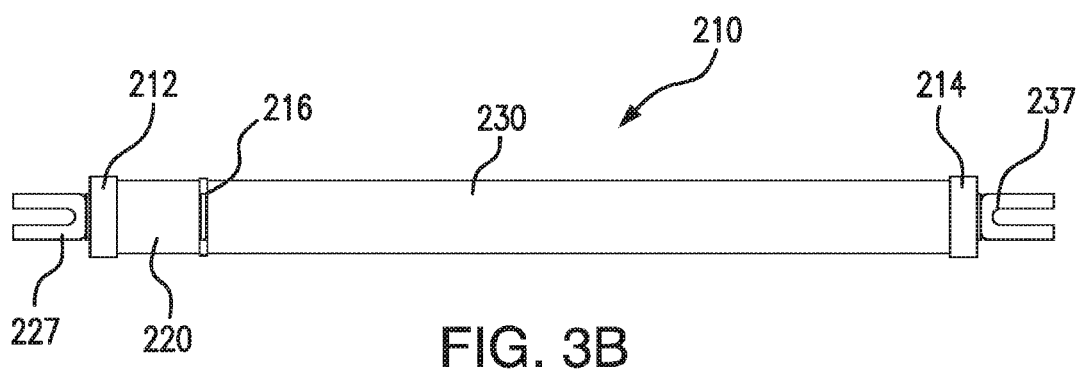
FIG. 3B illustrates a side view of a hydraulic cylinder according to non-limiting embodiments of the present invention.
Figure 3C:
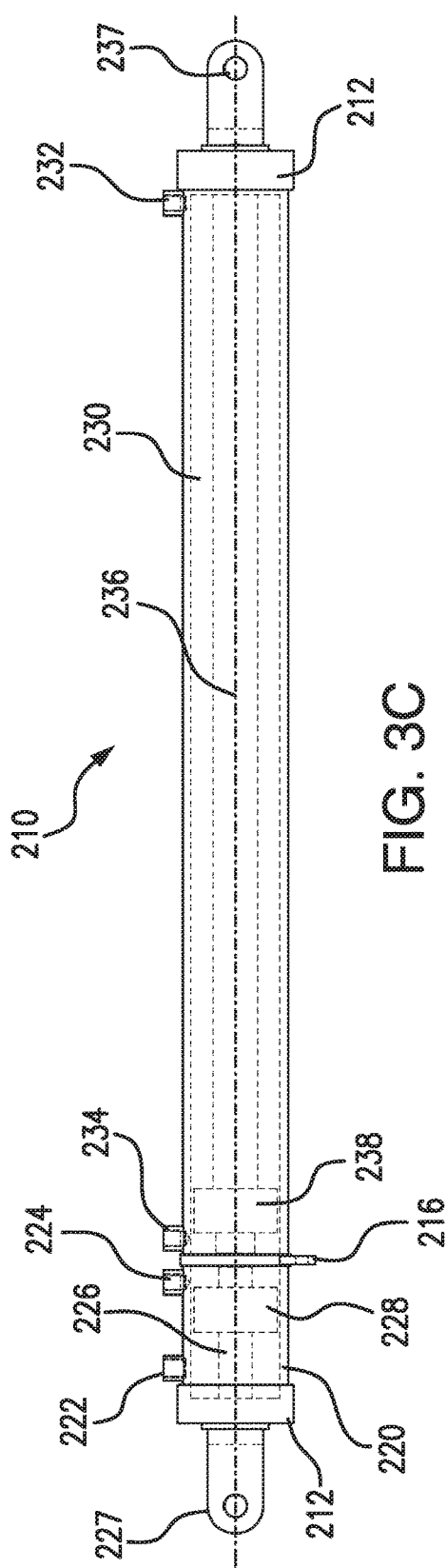
FIG. 3C illustrates a side view of a cylinder outlining a pair of pistons and rods disposed within the interior of the cylinder according to non-limiting embodiments of the present invention.
Figure 3D:
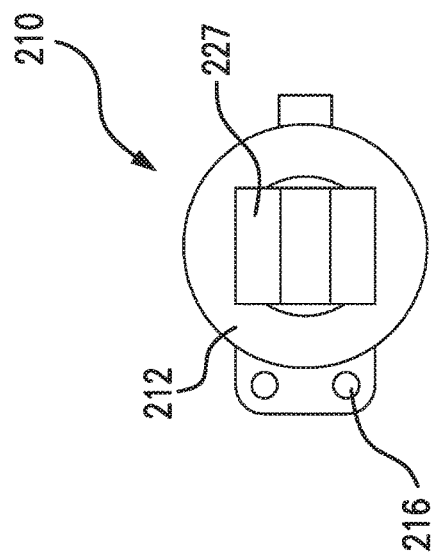
FIG. 3D illustrates a front end view of a cylinder according to non-limiting embodiments of the present invention.
Figure 4A:
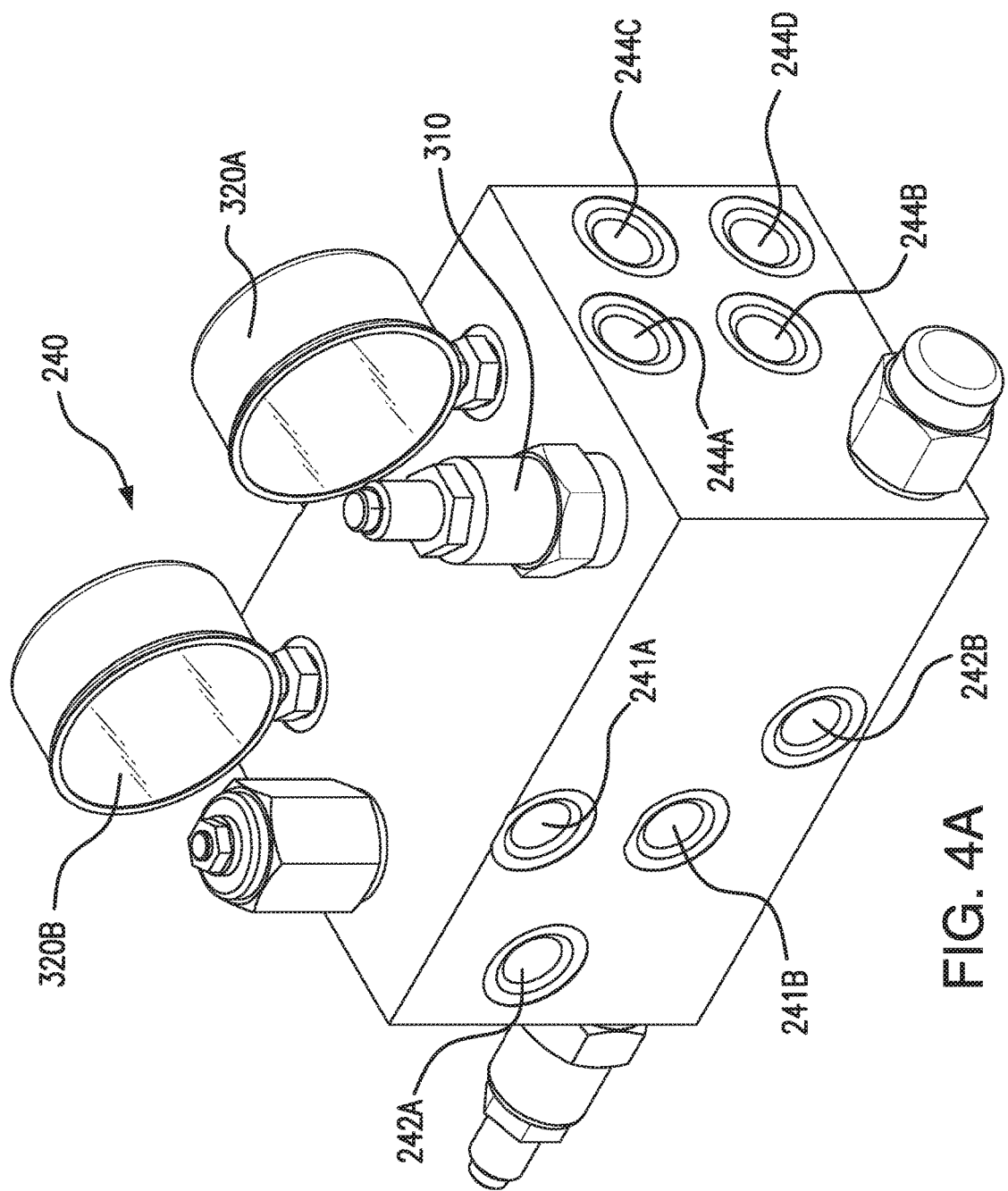
FIG. 4A illustrates a perspective view of a hydraulic valve block assembly according to non-limiting embodiments of the present invention.
Figure 4B:
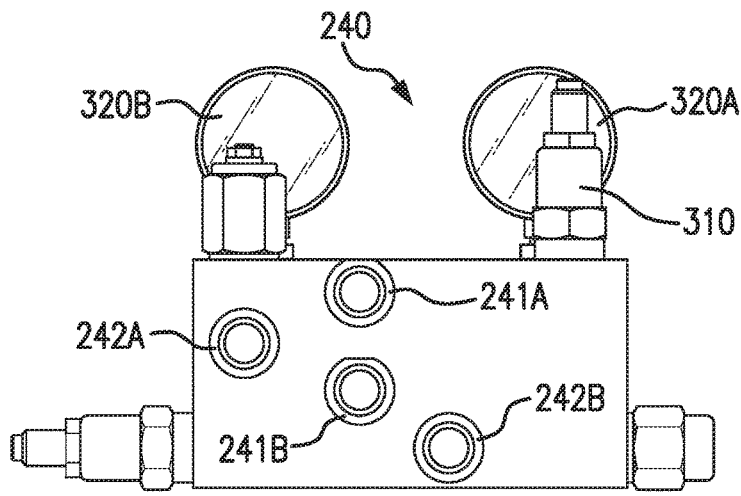
FIGS. 4B-E illustrate side views of a hydraulic valve block assembly according to non-limiting embodiments of the present invention.
Figure 4C:
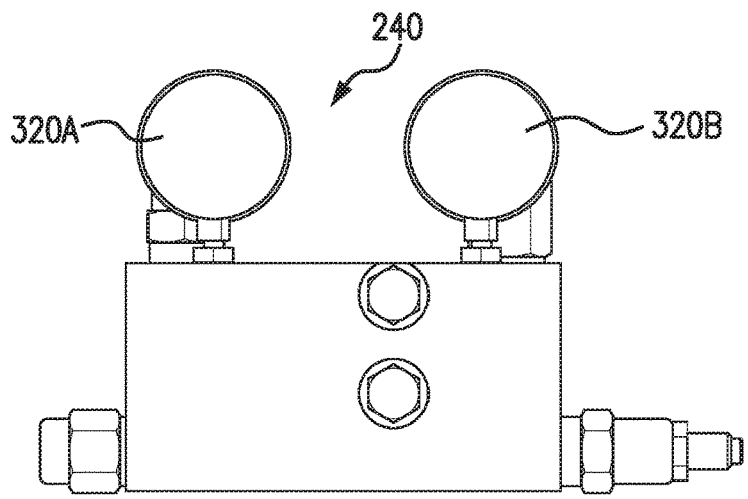
Figures 4D, 4E:
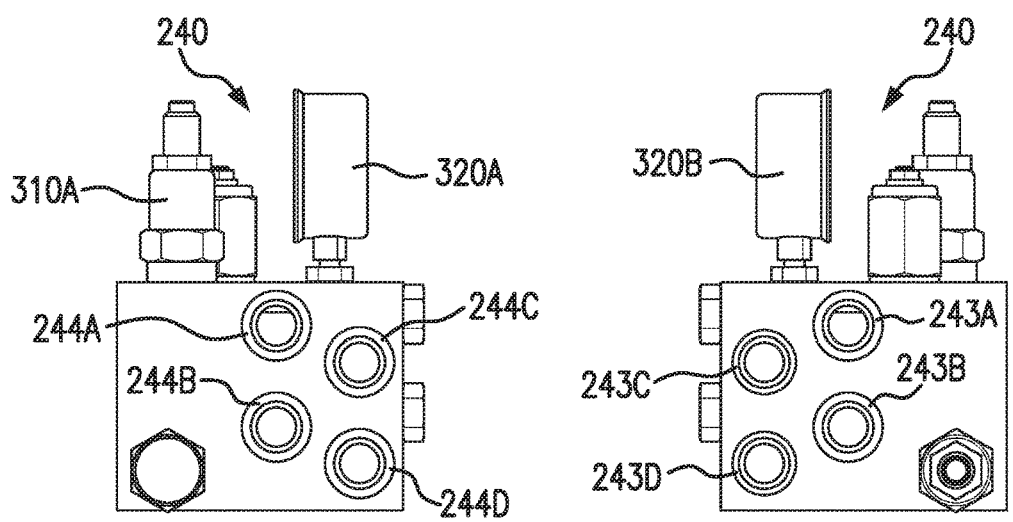
Figure 5:
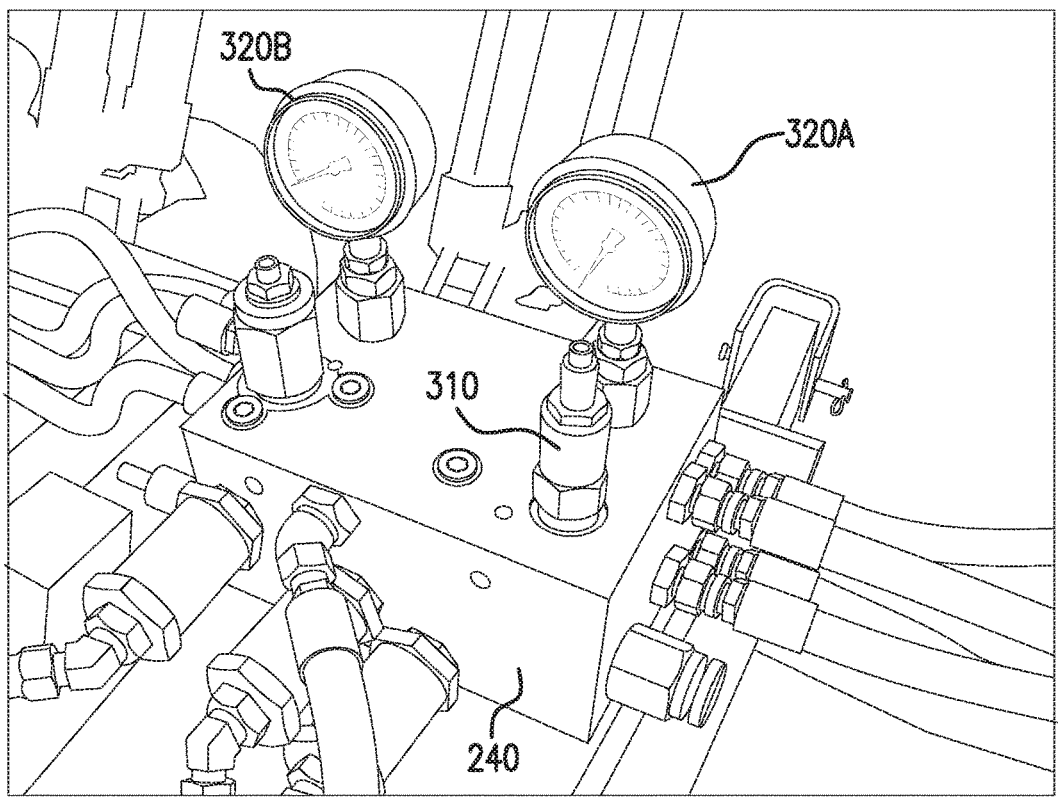
FIG. 5 is an example view of a hydraulic valve block assembly according to non-limiting embodiments of the present invention.

As shown in FIG. 3C, the first chamber 220 of the cylinder 210 includes a wing-leveling rod 226 extending from the interior of the first chamber 220 and through the first end 212 of the cylinder 210. The wing-leveling rod 226 includes a mating joint 227 at its exterior end projecting away from the first end 212 of the cylinder 210. The first chamber 220 further includes a piston 228 affixed to the interior end of the leveling rod 226, in which the piston 228 is disposed in an sliding engagement with the interior surface of the first chamber 220. The first chamber 220 is configured to receive and return hydraulic fluid through a rod side port 222 and a partition side port 224. When hydraulic fluid is supplied through rod side port 222, the piston 228 slides toward the partition plate 216, thereby retracting the wing-leveling rod 226. When hydraulic fluid is supplied through partition side port 224, the piston 228 slides toward the first end 212 of the cylinder 210, thereby extending the wing-leveling rod 226.

The second chamber 230 of the cylinder 210 includes a wing-folding rod 236 extending from the interior of the second chamber 230 and through the second end 214 of the cylinder 210. The wing-folding rod 236 includes a mating joint 237 at its exterior end projecting away from the second end 214 of the cylinder 210. The second chamber 230 further includes a piston 238 affixed to the interior end of the folding rod 236, in which the piston 238 is disposed in an sliding engagement with the interior surface of the second chamber 230. The second chamber 230 is configured to receive and return hydraulic fluid through a rod side port 232 and a partition side port 234. When hydraulic fluid is supplied through rod side port 232, the piston 238 slides toward the partition plate 216, thereby retracting wing-folding rod 236. When hydraulic fluid is supplied through partition side port 234, the piston 238 slides toward the second end 214 of the cylinder 210, thereby extending the wing-folding rod 236

Due to the dual capabilities of the cylinder 210, the hydraulic system 200 of the present invention may apply controlled down pressure to the wings of the farm implement in the field to ensure that proper soil working depth is always maintained. The hydraulic system 200 and cylinders 210 of the present invention also can allow the wings of the farm implement to float up or down in the field, with a controlled down pressure, and still is capable of lifting the wings up to level on the end of the field when the tractor hitch (e.g., tractor 3-point) raises the farm implement out of the soil.

The hydraulic valve block assembly 240 of the hydraulic system 200 insures the wings will function properly when raising or lowering the farm implement for field operation, or when folding or unfolding the wings for transport. The hydraulic valve block assembly 240 is designed to allow the hydraulics to function with a tractor hitch (e.g., tractor 3-point), when using the tractor hydraulic control valve system. As shown in FIGS. 4A-E, the hydraulic valve block assembly 240 includes a first set of return/supply ports 241A, 241B that are configured to communicate with a hydraulic outlet of a vehicle by connecting to a first set of return/supply hoses. The hydraulic valve block assembly 240 includes a second set of return/supply ports 242A, 242B that are configured to communicate with a hydraulic outlet of a vehicle by connecting to a second set of return/supply hoses. The hydraulic valve block assembly also includes a first set of cylinder ports 243A-D and a second set of cylinder ports 244A-D. The first set of cylinder ports 243A-D are configured to communicate with a first cylinder 210A of the hydraulic system 200, in which each cylinder port 243A-D of the first set is connected to a respective cylinder hose. The second set of cylinder ports 244A-D are configured to communicate with the second cylinder 210B of the hydraulic system 200, in which each cylinder port 244A-D is connected to a respective cylinder hose.

In some embodiments, the hydraulic system 200 comprises two pressure gauges supplied as part of the hydraulic valve block assembly 240. These gauges are used to monitor the wing hydraulic down pressure that is applied to the wings during the soil working operation. The hydraulic system 200 includes a first gauge 320A monitoring the pressure of the cylinder ports 243B, 244B that are in communication with the first chamber 220 of each cylinder 210. When the farm implement is in a soil working position, the cylinder ports 243B, 244B are configured to be at full system pressure so that the first chamber 220 of the cylinder 210 can submit sufficient force along the wing of the farm implement. When the farm implement is raised out of the ground, such as when the tractor is turning at the end of the field, the cylinder ports 243B, 244B are configured to be at minimal system pressure. Accordingly, the first gauge 320A allows a user to monitor the pressure of the cylinder ports 243B, 244B acting on a wing elevation circuit and adjust the pressure as desired.

The hydraulic system 200 includes a second gauge 320B monitoring the pressure of the cylinder ports 243D, 244D that are in communication with the second chamber 230 of the cylinder 210. When in the process of unfolding the wing into the field, the cylinder ports 243D, 244D are configured to be at the system operating pressure. When the wings are in a soil working position, the cylinder ports 243D, 244D are configured to have a control system pressure range between 600 to 900 PSI depending on the soil conditions and the size of the farm implement. In particular, the operating pressure of the cylinder ports 243D, 244D will be affected by the number of shanks, the shank attachment options, working depth of machine, and soil type. When the wings are folded in a transport position, the cylinder ports 243D, 244D are configured to be at minimal system pressure. Accordingly, the second gauge 320B allows a user to monitor the pressure of the cylinder ports 243D, 244D acting on a wing folding circuit and adjust the pressure as desired.

As shown in FIGS. 4A-E and 5, the hydraulic valve block assembly 240 may further include an adjustment screw 310 that may be tighten or loosen to alter the pressure acting on the wings. Because of the difference in soil type, machine working widths, operating depth of ripper and soil contour, on some farm implements, it may be necessary to increase, or decrease the down pressure of the wings while in the field working position. If the wings will not maintain working depth, the hydraulic operating pressure may be increased (e.g., screw tightened ¼ turn clockwise). If the wings will not float in field, the hydraulic operating pressure may be decreased (e.g., screw loosened ¼ turn counter-clockwise). In some embodiments, pressure setting will increase (screw turned in) or decrease (screw turned out) at a rate of 125 PSI per quarter turn. The screw should be adjusted ¼ of a turn at a time. The machine's in-field performance may be monitored after each adjustment, and the pressure further modified as needed.

Figure 6:
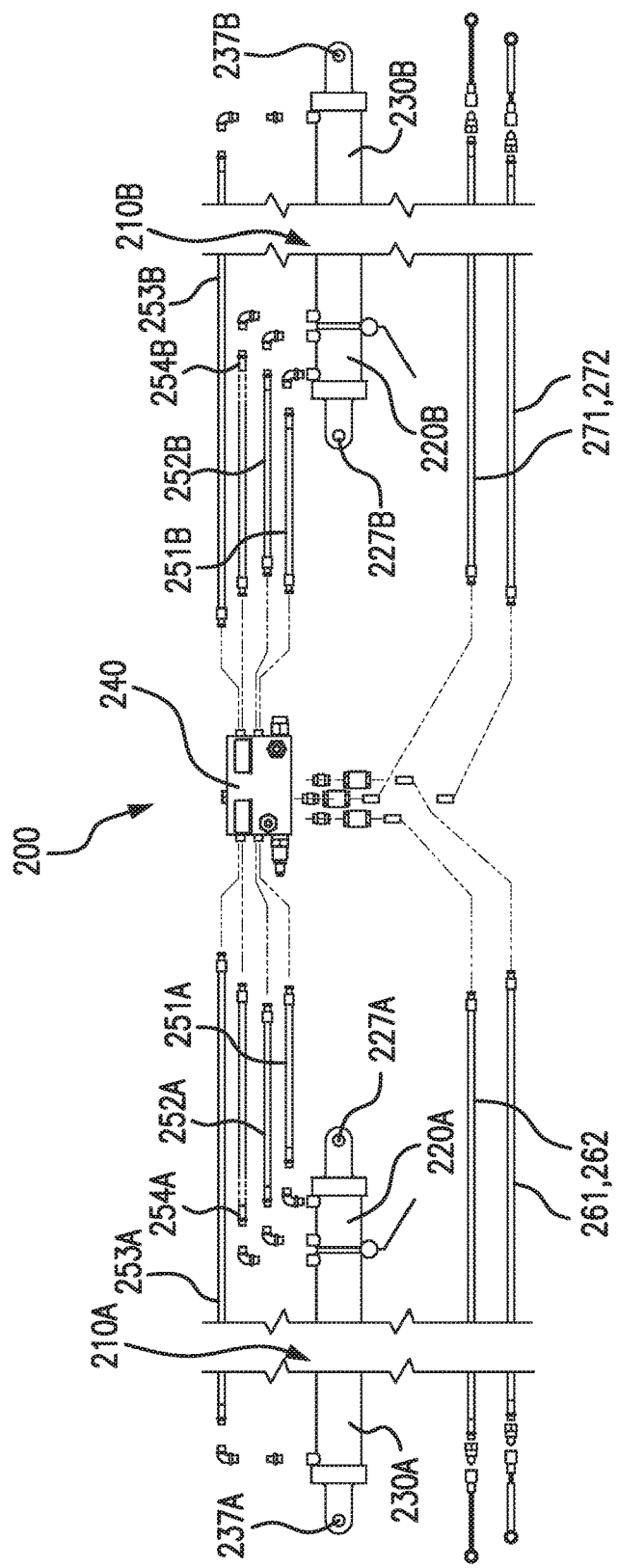
FIG. 6 is an exploded view of a hydraulic system according to non-limiting embodiments of the present invention.

FIG. 6 illustrates an exploded view of a hydraulic system 200 for a farm implement according to an embodiment of the present invention. As shown in FIG. 6, the hydraulic system 200 includes a first cylinder 210A associated with a first wing of a farm implement, a second cylinder 210B associated with a second wing of a farm implement, a hydraulic valve block assembly 240, and a plurality of hoses interconnecting the one or more cylinders 210A, 210B to the hydraulic valve block assembly 240. The hydraulic system 200 also includes a pump (not shown) and a reservoir (not shown) connected to hydraulic valve block assembly 240 to form a hydraulic circuit. In one embodiment, the pump and reservoir may be located in a vehicle that is towing the farm implement. In the illustrated embodiment, the plurality of hoses include a first set of cylinder hoses 251A-254A that connect the first cylinder 210A to the hydraulic valve block assembly 240. The plurality of hoses include a second set of cylinder hoses 251B-254B that connect the second cylinder 210B to the hydraulic valve block assembly 240. The plurality of hoses further include a first set of return/supply hoses 261, 262 and a second set of return/supply hoses 271, 272 that connected the hydraulic valve block assembly 240 to the pump and reservoir of the hydraulic system (not shown) so that pressurized hydraulic fluid may pass back and forth between the reservoir and the hydraulic valve block assembly 240 via the pump. Accordingly, the pressurized hydraulic fluid entering the hydraulic valve block assembly 240 may pass through either one of the first cylinder 210A or second cylinder 210B, and return back to the hydraulic valve assembly 240.

Figure 7:
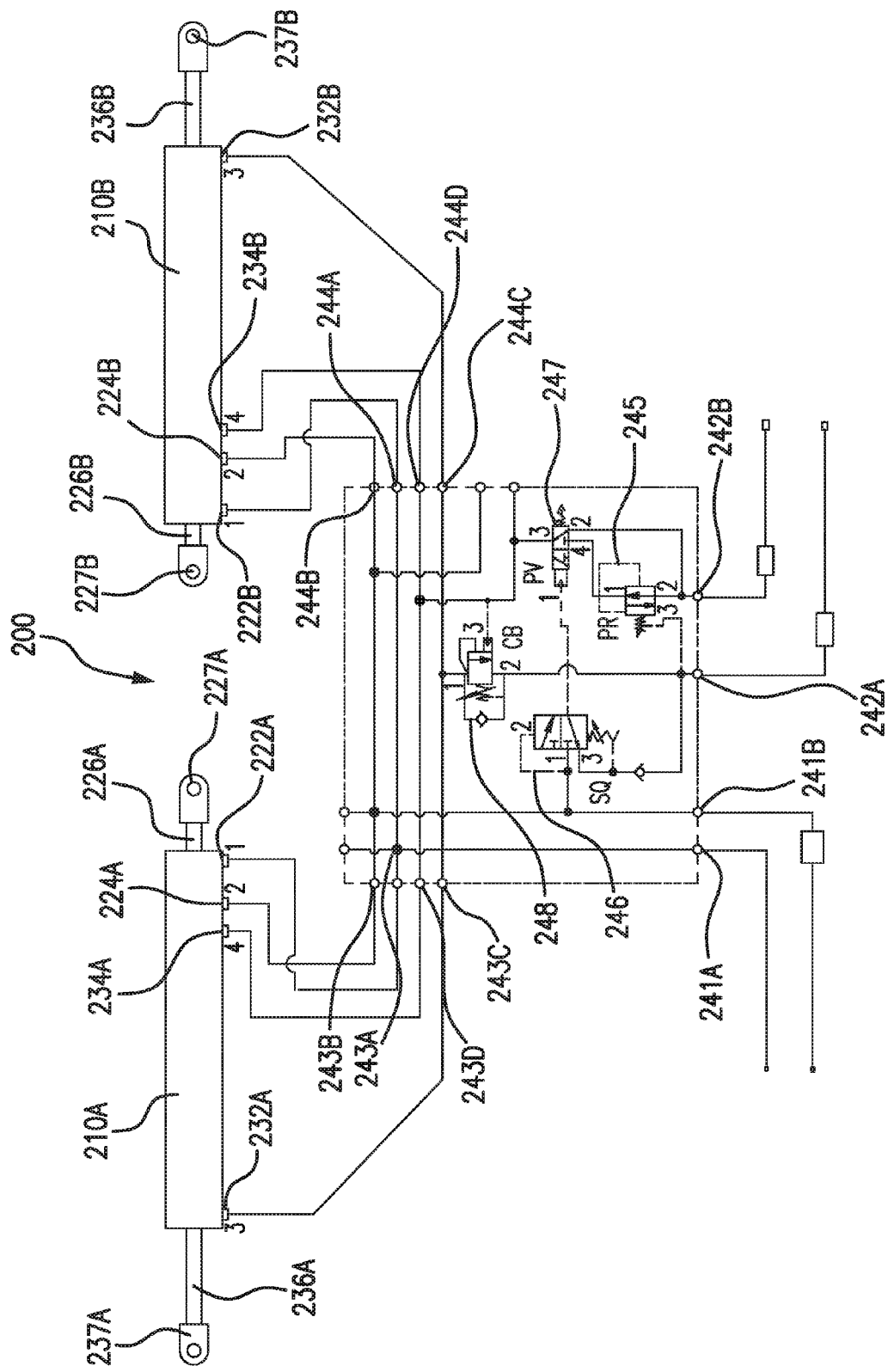
FIG. 7 is a circuit diagram for a hydraulic system according to non-limiting embodiments of the present invention.

FIG. 7 illustrates a schematic diagram of the hydraulic system 200 according to an embodiment of the present invention. According to the illustrative embodiment, the hydraulic system 200 includes two hydraulic circuits: a wing elevation circuit and a wing folding circuit. The wing elevation circuit includes the first set of return/supply hoses 261, 262 extending between a first hydraulic outlet of a vehicle (not shown) and the first set of return/supply ports 241A, 241B of the hydraulic valve assembly 240. The wing elevation circuit further includes cylinder hoses 251A, 251B, 252A, and 252B extending between the cylinder ports 243A, 243B, 244A, and 244B of the hydraulic valve block assembly 240 and the ports 222A, 222B, 224A, and 224B of the first chamber 220A, 220B of a respective cylinder 210A, 210B. Accordingly, the wing elevation circuit is configured to supply hydraulic fluid from a first outlet of the vehicle to the first chamber 220 of each cylinder 210 to retract or expand the wing-elevating rod 226 of each cylinder 210. The wing elevation circuit is further configured to return hydraulic fluid from the first chamber 220 of each cylinder 210 of the hydraulic system to the hydraulic reservoir in the vehicle.

According to the illustrative embodiment, the wing folding circuit includes the second set of return/supply hoses 271, 272 extending between a second hydraulic outlet of a vehicle (not shown) and the second set of return/supply ports 242A, 242B of the hydraulic valve assembly 240. The wing folding circuit further includes cylinder hoses 253C, 253D, 254C, and 254D extending between the cylinder ports 243C, 243D, 244C, 244D of the hydraulic valve block assembly 240 and ports 232A, 232B, 234A, and 234B of the second chamber 230A, 230B of a respective cylinder 210A, 210B. Accordingly, the wing folding circuit is configured to supply hydraulic fluid from a second outlet of the vehicle to the second chamber 230 of each cylinder 210 to retract or expand the wing-folding rod 236 of each cylinder 210. The wing folding circuit is further configured to return hydraulic fluid from the second chamber 230 of each cylinder 210 of the hydraulic system to the hydraulic reservoir in the vehicle In some embodiments, the wing elevation circuit is configured to elevate the wings of a farm implement to be level with the main frame by first introducing pressurized hydraulic fluid from a hydraulic outlet of a vehicle to the return/supply port 241A of the hydraulic valve block assembly 240 via the return/supply hose 261. The hydraulic valve block assembly 240 directs the hydraulic fluid through cylinder ports 243A, 244A, whereby hydraulic fluid passes through cylinder hoses 251A, 251B and into a rod-side port 222A, 222B of the first chambers 220A, 220B. As a result, the hydraulic fluid entering the rod-side ports 222A, 222B retracts the wing elevation rods 226A, 226B of cylinders 210A, 210B, thereby raising the wings of the farm implement to be level with the main frame. As the wing elevation rods 226, 226B are retracting, hydraulic fluid exits the first chambers 220A, 220B of cylinders 210A, 210B through the partition side ports 224A, 224B. The hydraulic fluid passes through cylinder hoses 252A, 252B and into cylindrical ports 243B, 244B of the hydraulic valve block assembly 240. The hydraulic valve block assembly 240 directs the hydraulic fluid back to the hydraulic outlet of the vehicle by passing through the return/supply port 241B and the return/supply hose 262.

In some embodiments, the wing elevation circuit is also configured to lower the wings from the main frame of a farm implement, for example by five degrees, by first introducing pressurized hydraulic fluid from a hydraulic outlet of a vehicle to the return/supply port 241B of the hydraulic valve block assembly 240 via the return/supply hose 262. The hydraulic valve block assembly 240 directs the hydraulic fluid through cylinder ports 243B, 244B, whereby the hydraulic fluid passes through cylinder hoses 252A, 252B and into the partition-side ports 224A, 224B of the first chambers 220, 220B. Consequently, the hydraulic fluid entering the partition-side ports 224A, 224B forces the wing-elevation rods 226A, 226B to extend out of the cylinders 210A, 210B, thereby lowering the wings of the farm implement toward the ground surface. As the wing-elevation rods 226A, 226B are retracting, hydraulic fluid exits the first chambers 220A, 220B of cylinders 210A, 210B through the rod-side ports 222A, 222B. The hydraulic fluid passes through cylinder hoses 251A, 251B and into cylindrical ports 243A, 244A of the valve block assembly 240. The hydraulic valve block assembly 240 directs the hydraulic fluid back to the hydraulic outlet of the vehicle by passing through the return/supply port 241A and the return/supply hose 261.

In some embodiments, the wing folding circuit is configured to fold the wings of the farm implement to a transport position by first introducing pressurized hydraulic fluid from a hydraulic outlet of a vehicle to the return/supply port 242A via the return/supply hose 271. The hydraulic valve block assembly 240 directs the hydraulic fluid through cylinder ports 243C, 244C, whereby the hydraulic fluid passes through cylinder hoses 253A, 253B and into the rod-side ports 232A, 232B of the second chambers 230A, 230B. Accordingly, the hydraulic fluid entering the rod-side ports 232A, 232B retracts the wing-folding rods 236A, 236B of cylinders 210A, 210B, thereby folding the wings of the farm implement into a transport position. As the wing-folding rods 236A, 236B are retracting, hydraulic fluid exits the second chambers 230A, 230B of cylinders 210A, 210B through the partition side ports 234A, 234B. The hydraulic fluid passes through cylinder hoses 254A, 254B and into cylindrical ports 243D, 244D of the hydraulic valve block assembly 240. The hydraulic valve block assembly 240 directs the hydraulic fluid back to the hydraulic outlet of the vehicle by passing through the return/supply port 242B and the return/supply hose 272.

In some embodiments, the wing folding circuit is configured to unfold the wings of the farm implement to be level with the main frame by first introducing pressurized hydraulic fluid from a hydraulic outlet of a vehicle to the return/supply port 242B of the hydraulic valve block assembly 240 via the return/supply hose 272. The hydraulic valve block assembly 240 directs the hydraulic fluid through cylinder ports 243D, 244D, whereby the hydraulic fluid passes through cylinder hoses 254A, 254B and into the partition-side ports 234A, 234B of the second chambers 230A, 230B. Consequently, the hydraulic fluid entering the partition-side ports 234A, 234B forces the wing-folding rods 236A, 236B to extend out of the cylinders 210A, 210B, thereby unfolding the wings of the farm implement toward the level of the main frame. As the wing-folding rods 236A, 236B are retracting, hydraulic fluid exits the second chambers 230A, 230B of cylinders 210A, 210B through the rod-side ports 232A, 232B. The hydraulic fluid passes through cylinder hoses 253A, 253B and into cylindrical ports 243C, 244C of the valve block assembly 240. The hydraulic valve block assembly 240 directs the hydraulic fluid back to the hydraulic outlet of the vehicle by passing through the return/supply port 242A and the return/supply hose 271.

Figure 8A:
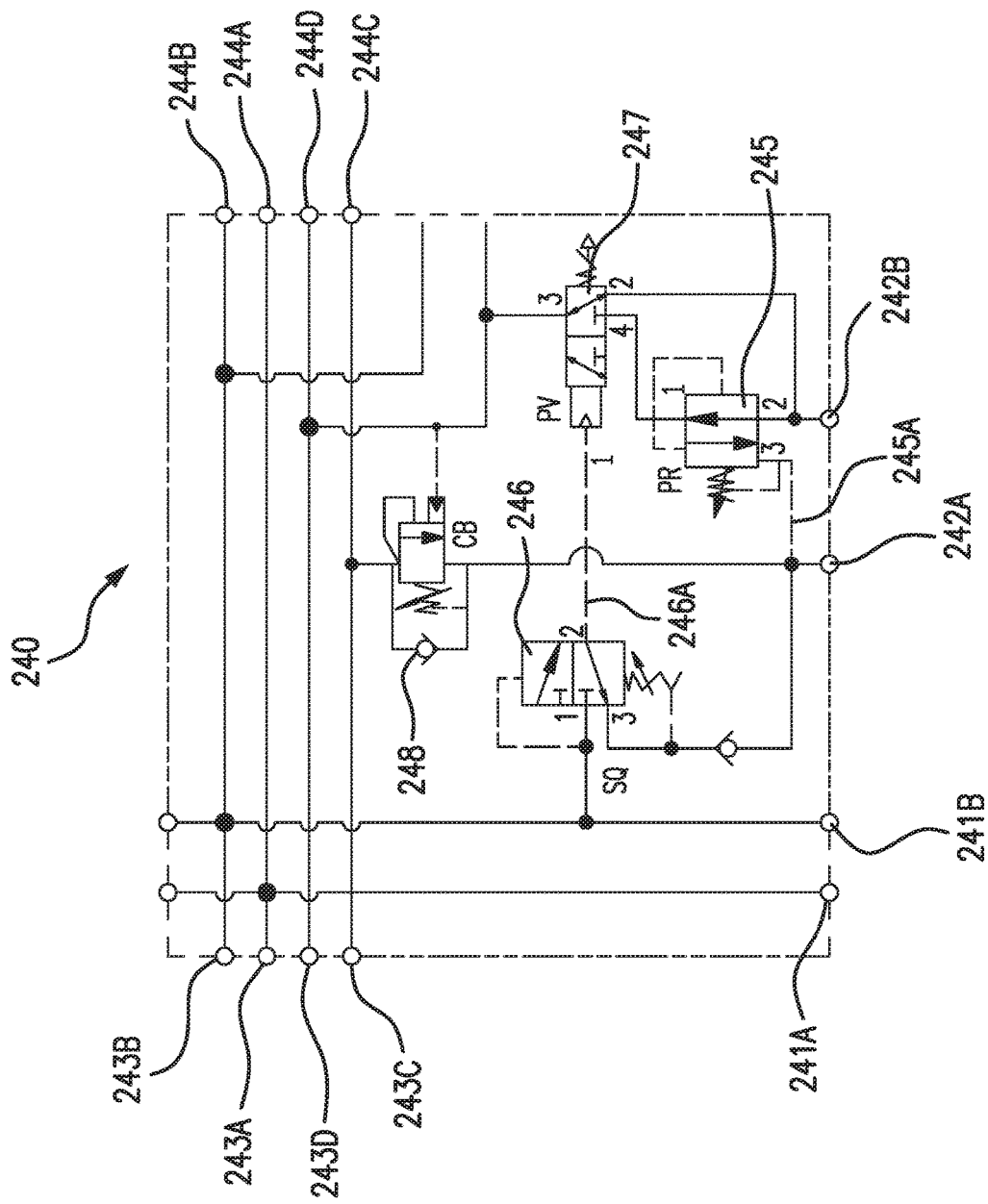
FIG. 8A is a circuit diagram of a valve block assembly according to non-limiting embodiments of the present invention.

FIG. 8A illustrates a schematic view of the hydraulic valve block assembly 240 according to an embodiment of the present invention. Consistent with the description of the hydraulic valve block assembly of FIGS. 4A-E, 6, and 7, the hydraulic valve block assembly 240 shown in FIG. 8A includes a first set of return/supply ports 241A, 241B, a second set of return/supply ports 242A, 242B, a first set of cylinder ports 243A-D, and a second set of cylinder ports 244A-D. Furthermore, the valve block assembly 240 includes a set of valves to control the pressure of the hydraulic fluid and regulate the direction of the hydraulic fluid flow. In particular, the valve block assembly includes a pressure reducing valve 245, a sequence valve 246, a directional valve 247, and a counter-balance valve 248.

In the illustrated embodiment, the pressure reducing valve 245 is connected to a flow path extending between return/supply port 242B and cylinder ports 243D, 244D of the hydraulic valve block assembly 240. The pressure reducing valve 245 provides an alternative pathway 245A to a flow path extending between return/supply port 242A and cylinder ports 243C, 244C of the hydraulic valve block assembly 240. The pressure reducing valve 245 is configured to control the pressure of hydraulic fluid entering through return/supply port 242B of the wing folding circuit. As the fluid entering return/supply port 242B exceeds a predetermined pressure, the pressure reducing valve 245 allows the fluid to pass to the return/supply port 242A via the alternative pathway 245A, thereby lowering the pressure of the hydraulic fluid flowing towards cylinder port 244D. Accordingly, the pressure reducing valve 245 maintains the hydraulic fluid entering the hydraulic valve block assembly 240 in the wing folding circuit at a reduced pressure.

In the illustrated embodiment, the sequence valve 246 and the directional valve 247 operate collaboratively to ensure the proper functioning of the wings. The sequence valve 246 is connected to a flow path extending between return/supply port 241B and cylinder ports 243B, 244B of the hydraulic valve block assembly 240. The sequence valve 246 provides an alternative pathway 246A that directs fluid towards directional valve 247, which is connected to the flow path extending between return/supply port 242B and cylinder ports 243D, 244D of the hydraulic valve block assembly 240. At steady state, the sequence valve 246 blocks hydraulic fluid from entering the alternative pathway 246A, thereby directing all hydraulic fluid between cylinder ports 243B, 244B and return/supply port 241B. Once the hydraulic fluid enters through the return/supply port 241B at a predetermined pressure, the sequence valve 246 is configured to permit fluid flow toward the directional valve 247 via the alternative pathway 246A. Consequently, hydraulic fluid entering the hydraulic valve block assembly 240 via the return/supply port 241B splits into two directions. The first direction of fluid flow is directed to cylinder ports 243B, 244B, thereby remaining in the wing elevation circuit. The second direction of flow fluid flow is directed towards the directional valve 247 via the alternative pathway 246A, thereby redirecting some of the hydraulic fluid in the wing elevation circuit to the wing folding circuit. When the sequence valve 246 redirects hydraulic fluid towards the directional valve 247, the directional valve 247 is configured to combine the redirected fluid with the hydraulic fluid flowing along the flow path extending between return/supply port 242B and cylinder ports 243D, 244D.

During operation, the sequence valve 246 may redirect hydraulic fluid towards directional valve 247 while the wings are in the lowered operating position, in which the wing folding rod 236 and the wing elevation rod 226 are fully extended. By redirecting fluid towards the directional valve 247, the sequence valve 246 ensures that the wings remain unfolded in the while the wings are set in the lowered operating position. Sometimes while the wing elevation rod 226 is in the process of extending, hydraulic fluid escapes through the partition side port 234 of the wing folding chamber 230 and flows toward cylinder ports 243D, 244D of the hydraulic valve block assembly 240. When hydraulic fluid escapes through the partition side port 234 and flows through cylinder ports 243D, 244D, the directional valve 247 is configured to direct the escaped hydraulic fluid to the pressure reducing valve 245, whereby the pressure reducing valve 245 directs fluid toward return/supply port 242A of the hydraulic valve block assembly 240.

Figure 8B:
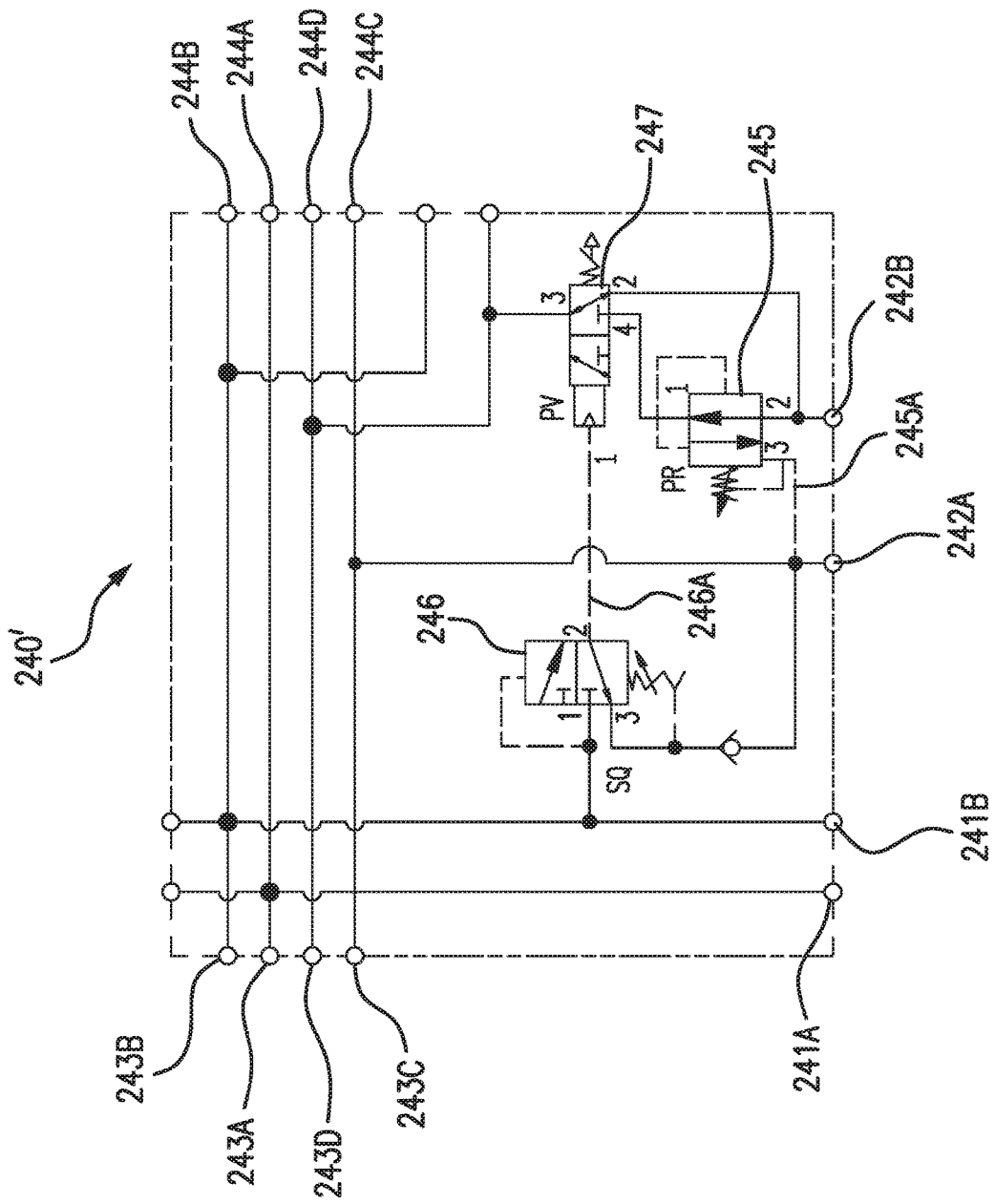
FIG. 8B is a circuit diagram of a valve block assembly according to non-limiting embodiments of the present invention.

FIG. 8B illustrates a schematic view of the hydraulic valve block assembly 240' according an embodiment of the present invention. Consistent with the description of the hydraulic valve block assembly of FIG. 4A, the hydraulic valve assembly 240' shown in FIG. 4B comprises a set of valves to control the pressure of the hydraulic fluid and regulate the direction of the hydraulic fluid flow. The set of valves includes a pressure reducing valve 245, a sequence valve 246, and a directional valve 247. Unlike the hydraulic valve assembly 240 of FIG. 4A, the hydraulic valve assembly 240' of FIG. 4B does not include a counter-balance valve.

As a preferred embodiment, the hydraulic system 200 includes a vehicle, such as a tractor, having two dedicated hydraulic outlets that are connected to the hydraulic valve block assembly 240 in order to obtain optimal functioning of the hydraulic system 200. Accordingly, the wing element circuit and the wing folding circuit of the hydraulic system 200 may each be directed to a single hydraulic outlet of a vehicle. However, the hydraulic system 200 may operate with other types of vehicle hydraulic systems without departing from the scope of the present invention. According to the preferred embodiment, the first vehicle hydraulic outlet directed to return/supply ports 241A, 241B allows the wings to pivot from level with the frame (i.e. the base position) to approximately 5 degrees down in the field (i.e. the lowered operating position) and back to level when the farm implement is raised for turning on the ends of the field. The second vehicle hydraulic outlet directed to return/supply ports 242A, 242B allows the wings to be unfolded from the transport position to the base position or folded from the base position to the transport position. In addition, the second outlet may be timed with the vehicle's 3-point raise and lower cycle in order to allow the hydraulic system 200 to function properly, such as allowing the wings to properly lift on the end of the field and fold properly for transport.

In some embodiments, the controls of the hydraulic system 200 may be set up in the cab of the vehicle. When setting up the controls for the hydraulic system 200, the first vehicle hydraulic function control may be selected for the return/supply ports 241A and 241B of the hydraulic valve block assembly 240. In some embodiments, it may be necessary to unfold the wings before lowering the 3-point hitch. After the wings are unfolded, and the 3-point hitch of the vehicle is lowered into a field or soil working position, the wing fold cylinder segment hydraulics system (e.g., return/supply hoses 271, 272 to the return supply ports 242A, 242B on the front of the hydraulic valve block assembly 240) may be set into the detent position on the vehicle. In some embodiments, constant flow of approximately 6 to 10 GPM during the soil working cycle should be maintained.

In some embodiments, the vehicle outlets may be programmed to ensure proper control of the wings' functions. The first hydraulic outlet of the vehicle may be sequenced and cycled with the vehicle's 3-point raise and lower cycle. Consistent with the description hydraulic system of FIGS. 2 and 3, the first hydraulic outlet of the vehicle may be hooked to the wing elevation circuit (e.g., return/supply hoses 261, 261 to return/supply ports 241A, 241B on the front of the hydraulic valve block assembly 240). Accordingly, the wing-elevation circuit of the hydraulic system 200 will bring the farm implement's wing frames up to approximately level when the machine is raised out of the soil, at the end of the field. With proper programming of the vehicle 3-point lift and the retract of the wing fold chambers, the implement's wings will raise to level as the vehicle 3-point picks up the implement at the end of the field. In addition, timing of this operation may be set on vehicle's first hydraulic outlet to raise the wings to approximately level as the tractor 3-point is raising the farm implement out of the soil at the end of the field. In some embodiments, pressurizing the return/supply port 241A (pressure to rod-side port 222) will raise the farm implement's wings to approximately level, and pressurizing the return/supply port 241B (pressure to partition side port 224) will allow the farm implement's wings to lower approximately 5 degrees below level.

In some embodiments, the vehicle's second hydraulic outlet and the wing folding circuit may be programmed as follows. The wing folding circuit may be used for folding and unfolding of the farm implement's wings for transport and wing down pressure in the field (ports 232 and 234 of the cylinder 210). The vehicle's second hydraulic outlet may be configured to hook to the wing folding circuit (return/supply ports 242A, 242B on the front of the hydraulic valve block assembly 240) and the rod-side port 232 and partition side port 234 of the second chamber 230. The second chamber 230 of the cylinder 210 is configured to unfold farm implement's wings to a field working position, or fold the farm implement's wings into a transport position. In some embodiments, pressurizing the return/supply port 242A (pressure to cylinder port 243C, 244C) will allow the farm implement's wings to fold into transport position. In some embodiments, pressurizing the return/supply port 242B (pressure to cylinder port 243D, 244D) will allow the farm implement's wings to unfold from transport position to approximately level with the main frame.

In some embodiments, certain protocols may be programmed with a controller of the hydraulic system to ensure safety of the operator. The controller of the hydraulic system may be configured to only allow the farm implement's wings to be folded or unfolded while the vehicle's 3-point hitch is in the raised position. The controller of the hydraulic system may configured to fully retract the wing folding rod to ensure that the farm implement's wings are completely folded into the transport position and locked up for transporting.

Operating in the Field

Five exemplary operations are described below for operating a farm implement using the hydraulic system of embodiments of the present invention. These operations may be performed individually or in any combination with each other, as will be apparent to one of ordinary skill in the art.

First Exemplary Operation—Unfolding the Wings

With the vehicle's 3-point hitch still raised, the second hydraulic outlet of the vehicle may be activated so that pressurized fluid enters return/supply ports 242A, 242B via return/supply hoses 271, 272. In response, the farm implement's wings should unfold and stop at approximately level with the main frame of the farm implement.

Second Exemplary Operation—Lowering the Farm Implement into the Soil

With farm implement's wings lowered to approximately level with the main frame, the second operation may occur when proceeding forward with vehicle and lowering the 3-point hitch on the vehicle to so that the farm implement reaches a proper soil working depth. With appropriate controller programming, the leveling rods 226 of the cylinders 210 should extend as the farm implement is being lowered into the soil. A slight delay of hydraulic cylinder extend cycle will guarantee the farm implement's base frame shanks will contact the soil at the same time as the farm implement's wing shanks. The wing-folding rod 236 of the cylinders 210 should remain extended while the farm implement is in the soil working position. The wing folding circuit (the supply from second tractor outlet to the return/supply ports 242A, 242B) is configured to be fully extended as the farm implement initially engages into the soil.

Third Exemplary Operation—Soil Working of the Ripper Stripper®

The controller for the wing folding circuit of the hydraulic system should be placed into the detent position or float when the farm implement is in the soil working position. The flow to the return/supply ports 242A, 242B may be set at 6-10 GPM while in the detent position. This will ensure proper function of the farm implement's flex wing feature, and the wings will maintain pressurized down force and still be able to flex through the soil during the soil tillage operation. In some embodiments, the wing elevation circuit of the hydraulic system (supply from the first hydraulic outlet to the return/supply ports 241A, 241B) should remain pressurized and the elevating rods 226 in the fully extended position while the farm implement is in the soil working position. In some embodiments, the elevating rod 226 of the wing elevation circuit should only retract as the vehicle 3-point hitch raises the farm implement at the end of the field.

In some embodiments, to prevent machine damage, the second hydraulic outlet of the vehicle connected to return/supply ports 242A, 242B should be left in the detent position and flow set at 6-10 GPM while the Ripper Stripper® is in the soil working position.

Fourth Exemplary Operation—Raising the Farm Implement Out of the Soil at the End of the Field When raising the farm implement out of the soil at the end of the field, each elevating rod 226 of the wing elevation circuit should retract as the vehicle's 3-point hitch raises the farm implement out of the soil. The wings should remain approximately level with the main frame when the farm implement is raised out of the soil. The first hydraulic outlet of the vehicle may be programmed to raise the wings to level as the tractor 3-point hitch raises the farm implement out of the ground. The wing raise speed may be set to approximately match the lift cycle time of the tractor 3-point hitch. In some embodiments, proper programming of the tractor hydraulic outlet function may be done to automatically retract the wing to level cylinder as the tractor 3-point raises the machine out of the soil.

Fifth Exemplary Operation—Folding the Farm Implement's Wings into Transport

Before folding the farm implement's wings into transport, the farm implement should be raised out of the soil and each elevating rod 226 of the wing elevation circuit (the vehicle's first hydraulic outlet supplied to return/supply ports 241A, 241B) should be fully retracted. In some embodiments, if elevating rods 226 of the wing elevation circuit are not fully retracted, the wings may not fold into transport. Pressurizing the return/supply port 242A (pressure to cylinder port 243C, 244C) will fold the farm implement's wings into transport. Pressurizing the return/supply port 242B (pressure to cylinder port 243D, 244D) will allow the farm implement's wings to unfold from transport position to approximately level with the main frame.

Adjusting Wing Down Pressure in the Field

Because of the difference in soil type, machine working widths, operating depth of ripper and soil contour, on some farm implement's machines, it may be necessary to increase, or decrease the down pressure that the wings will apply when in the field working position. In response, the adjustment screw 510A can be set to increase or decrease pressure as needed (e.g., as shown in FIGS. 7A-E). If the wings will not maintain working depth, the hydraulic operating pressure may be increased (e.g., screw tightened ¼ turn clockwise). If the wings will not float in field, the hydraulic operating pressure may be decreased (e.g., screw loosened ¼ turn counter-clockwise).

From the above it will be appreciated that the hydraulic system of the present invention allows for improved operation of a tillage equipment in the field. It will also be appreciated that various changes can be made to the system without departing from the spirit and scope of the appended claims. For example, while the hydraulic system has been described with reference to the Ripper Stripper®, other types of tillage equipment can be used. Further, while timing of certain operations has been described as being based on the tractor 3-point, other timing configurations are possible, including either manual or automatic control. These and other modifications are intended to be encompassed by the appended claims.

We claim:

1. A hydraulic system for a farm implement having a frame and wings extending laterally outward from ends of the frame, the hydraulic system comprising:
 a wing elevation circuit configured to lower or raise the wings relative to the frame of the farm implement between a first position, wherein the wings extend approximately collinear with a lateral axis defined by the frame of the farm implement, and a second position, wherein the wings extend beneath the lateral axis defined by the frame;
 a wing folding circuit configured to fold or unfold the wings of the farm implement between the first position, wherein the wings extend approximately collinear with the lateral axis defined by the frame of the farm implement, and a transport position, wherein the wings are rotated about a horizontal axis transverse to the lateral axis; and
 a hydraulic valve block assembly in communication with the wing elevation circuit and the wing folding circuit, wherein the hydraulic valve block assembly is configured to control a flow of a hydraulic fluid in the wing elevation circuit and in the wing folding circuit.

2. The hydraulic system of claim 1, wherein the wing elevation circuit is further sequenced and cycled with a raise and lower cycle of a tractor hitch of the farm implement.

3. The hydraulic system of claim 2, wherein the hydraulic valve block assembly comprises a plurality of cylinder ports in direct communication with the one or more cylinders and a plurality of return/supply ports in communication with one or more hydraulic outlets of a vehicle.

4. The hydraulic system of claim 1 further comprising one or more cylinders, wherein each cylinder is in communication with the wing elevation circuit and the wing folding circuit, and each cylinder is configured to raise or lower a respective wing of the farm implement between the first and second positions and fold or unfold the respective wing of the farm implement between the first and transport positions.

5. The hydraulic system of claim 4, wherein each cylinder comprises a first chamber and a second chamber, wherein the first chamber and the second chamber are separated by a partition plate, and the first chamber is in communication with the wing elevation circuit and the second chamber is in communication with the wing folding circuit.

6. The hydraulic system of claim 5, wherein the first chamber comprises a wing-elevation rod extending through a first end of the cylinder, a first rod-side port adjacent to the first end of the cylinder, and a first partition-side port adjacent to the partition of the cylinder, and the first rod-side port and the second partition port are in communication with the wing-elevation circuit; and wherein the second chamber comprises a wing-folding rod extending through a second end of the cylinder, a second rod-side port adjacent to the second end of the cylinder, and second a partition-side port adjacent to the partition of the cylinder, and the rod-side port and the second partition port are in communication with the wing-elevation circuit.

7. The hydraulic system of claim 1, wherein the hydraulic valve block assembly includes a pressure reducing valve connected to the wing folding circuit, a directional valve connected to the wing folding circuit, and a sequence valve connected to the wing elevation circuit, and the sequence valve is configured to redirect hydraulic fluid between the wing elevation circuit and the wing folding circuit based upon a predetermined pressure in the wing elevation circuit.

8. The apparatus of claim 1, wherein at the second position, the wings extend beneath the frame at an angle with respect to the lateral axis.

9. The apparatus of claim 8, wherein the angle between the lateral axis and the wings at the second position ranges from about 1° to about 5°.

\* \* \* \* \*